US011956749B2

(12) United States Patent
Kumar et al.

(10) Patent No.: US 11,956,749 B2
(45) Date of Patent: Apr. 9, 2024

(54) METHOD AND USER EQUIPMENT FOR HANDLING COMMUNICATION IN SATELLITE COMMUNICATION NETWORK

(71) Applicant: Samsung Electronics Co., Ltd., Suwon-si (KR)

(72) Inventors: Lalith Kumar, Bangalore (IN); Kailash Kumar Jha, Bangalore (IN); Samiran Bhowmik, Bangalore (IN); Aman Agarwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 17/574,080

(22) Filed: Jan. 12, 2022

(65) Prior Publication Data

US 2022/0225266 A1 Jul. 14, 2022

(30) Foreign Application Priority Data

Jan. 13, 2021 (IN) .............................. 202141001691
Jan. 3, 2022 (IN) .............................. 2021 41001691

(51) Int. Cl.
*H04W 84/04* (2009.01)
*H04W 48/20* (2009.01)
(Continued)

(52) U.S. Cl.
CPC ........... *H04W 60/04* (2013.01); *H04W 48/20* (2013.01); *H04W 60/06* (2013.01); *H04W 84/042* (2013.01); *H04W 84/06* (2013.01)

(58) Field of Classification Search
CPC ..... H04W 60/04; H04W 48/20; H04W 60/06; H04W 84/042; H04W 84/06; H04W 48/18; H04W 48/04
See application file for complete search history.

(56) References Cited

U.S. PATENT DOCUMENTS

2019/0098596 A1 3/2019 Basu Mallick et al.
2019/0141586 A1 5/2019 Olsson et al.
(Continued)

FOREIGN PATENT DOCUMENTS

CN   110301143 A   10/2019
CN   110892782 A   3/2020
(Continued)

OTHER PUBLICATIONS

3GPP TR 24.821, 3rd Generation Partnership Project; Technical Specification Group Core Network and Terminals; Study on PLMN selection for satellite access (Release 17), p. 12, Section 5.6 (Year: 2020).*

(Continued)

*Primary Examiner* — Ashley Shivers
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for handling communication in a wireless network by a user equipment (UE) is provided. The method includes receiving a non-access stratum (NAS) message indicating that the UE is not permitted to access a first public land mobile network (PLMN) over a satellite communication along with geographical indication or a timer indication from the first PLMN. Further, the method includes determining a geographical area based on the received geographical indication or a timer value based on the timer indication. Further, the method includes starting a timer with the timer value. Further, the method includes determining that the UE is not allowed to access the first PLMN in the determined geographical area or the expiry of the timer. Further, the method (Continued)

includes performing a PLMN selection and registration procedure on a second PLMN based on the determination.

20 Claims, 12 Drawing Sheets

(51) Int. Cl.
*H04W 60/04* (2009.01)
*H04W 60/06* (2009.01)
*H04W 84/06* (2009.01)

(56) References Cited

U.S. PATENT DOCUMENTS

| | | | |
|---|---|---|---|
| 2020/0112938 A1* | 4/2020 | Kumar | H04W 60/04 |
| 2020/0178135 A1* | 6/2020 | Yun | H04W 36/0061 |
| 2020/0178153 A1 | 6/2020 | Jun et al. | |
| 2020/0205062 A1 | 6/2020 | Azizi et al. | |
| 2020/0213938 A1 | 7/2020 | Kim et al. | |
| 2022/0150812 A1* | 5/2022 | Lin | H04W 60/04 |

FOREIGN PATENT DOCUMENTS

| | | |
|---|---|---|
| KR | 10-2020-0080307 A | 7/2020 |
| WO | 2018/146300 A1 | 8/2018 |
| WO | 2020/030713 A2 | 2/2020 |
| WO | WO-2022033675 A1 * | 2/2022 |

OTHER PUBLICATIONS

Indian Office Action dated Jul. 26, 2022, issued in Indian Patent Application No. 202141001691.
3GPP TR 24.821, Technical Specification Group Core Network and Terminals Study on PLMN selection for satellite access (Release 17), Sep. 25, 2021.
3GPP; 3rd Generation Partnership Project; Technical Specification Group Core Network and Terminals; Non-Access-Stratum (NAS) functions related to Mobile Station (MS) in idle mode (Release 17); 3GPP TS 23.122; V17.1.1; Jan. 2021; Valbonne, France.
International Search Report with Written Opinion Dated Apr. 21, 2022; International Appln. No. PCT/KR2022/000517.

* cited by examiner

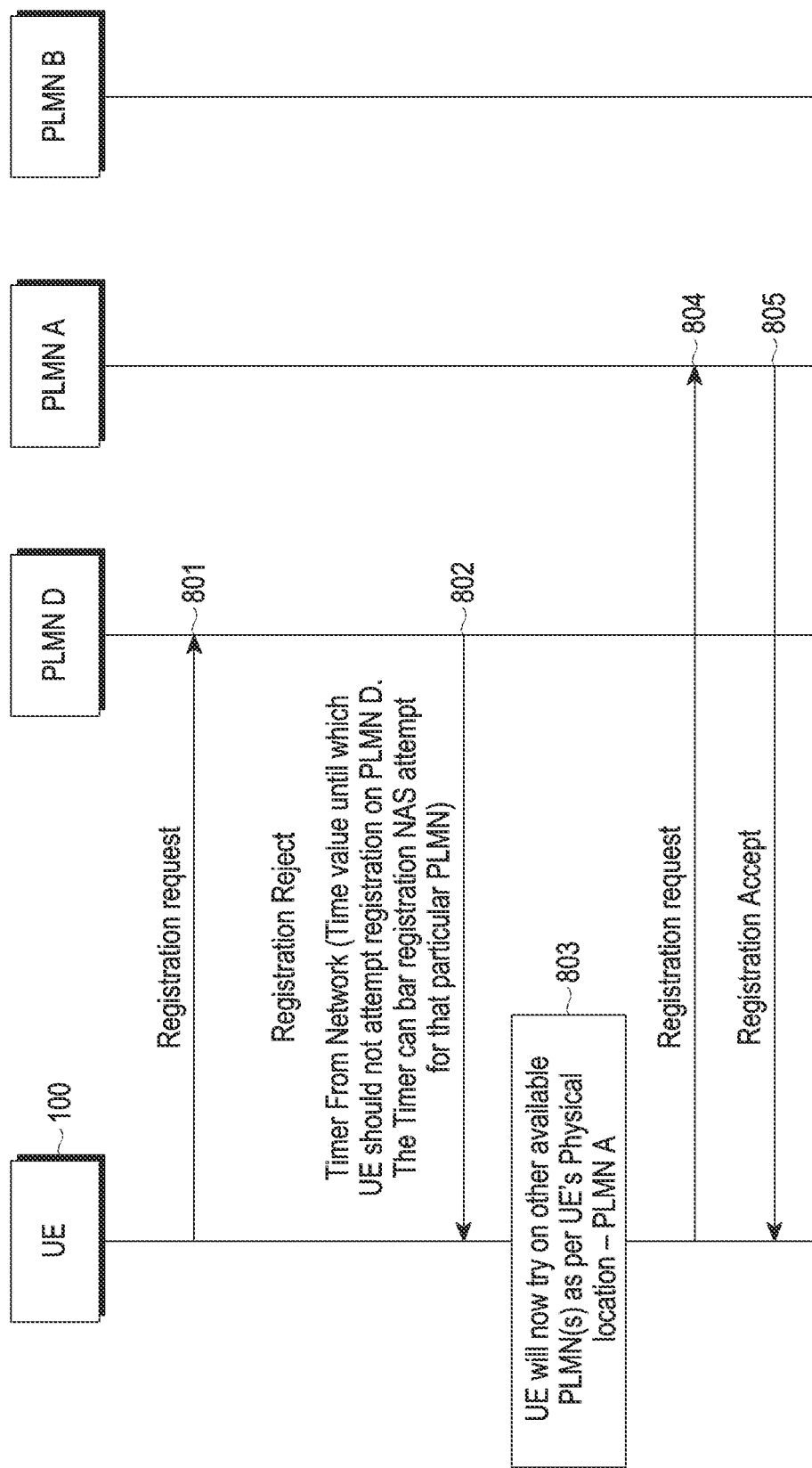

METHOD AND USER EQUIPMENT FOR HANDLING COMMUNICATION IN SATELLITE COMMUNICATION NETWORK

CROSS-REFERENCE TO RELATED APPLICATION(S)

This application is based on and claims priority under 35 U.S.C. § 119(a) of an Indian Provisional patent application number 202141001691, filed on Jan. 13, 2021, in the Indian Intellectual Property Office, and of an Indian Complete patent application number 202141001691, filed on Jan. 3, 2022, in the Indian Intellectual Property Office, the disclosure of each of which is incorporated by reference herein in its entirety.

BACKGROUND

1. Field

The disclosure relates to wireless networks. More particularly, the disclosure relates to accessing satellite communication by selecting a public land mobile network (PLMN) of a country, where a user equipment (UE) is physically located.

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Due to government regulations there is a requirement to "enforce the use of a core network (CN) of the PLMN in a country where the UE is physically located" to access the satellite communication. This implies that, if the UE can determine the country of its physical location, the UE can select the PLMN belonging to the respective country. However, in mobility cases, as the location of the UE is frequently changing, though the UE may be in a same cell or may not be in the same cell, the UE might move to a physical location which lies outside the country, where the CN of the current PLMN/serving network is not supposed to provide service. It should be noted that this is not a problem in traditional communication networks because the cell size is small but when it comes to satellite communication the cell size can be huge running into tens and hundreds of kilometers due to which even though the UE is in the same cell there is a high probability that physically UE might have crossed the boundary of the country. Thus, conventional approaches do not define to what extent and under which conditions the UE has to rely on a Mobile Country Code (MCC) of a serving PLMN to determine the country of its physical location. In this scenario, the UE after the mobility is considered to be in same cell and as the MCC has not changed of the same cell it may give a wrong impression to the UE that it is in the same country.

FIG. 1 is an example scenario (10) in which a UE (100) cannot differentiate when the UE (100) is allowed to access the satellite communication network and when the UE (100) is not allowed to access satellite communication network, according to the related art.

Further, if the UE (100) selects a PLMN, which is not allowed to operate based on the current location of the UE (100), then the network rejects registration of the UE (100), If the network rejects the registration of the UE (100) with a cause #11 (PLMN not allowed), then the UE (100) adds a PLMN ID of the corresponding PLMN to a Forbidden PLMN (FPLMN) list. After mobility the UE (100) may move to a different area where that PLMN is valid/allowed based on the new physical location of the UE (100). It is worth noting that the UE (100) may be in same cell (e.g., cell ID1) when it got the reject and now it is in new physical location in the same cell (e.g., cell ID1), then it is expected that UE (100) has to re-attempt on such a PLMN in the new physical location. However, the UE (100) does not re-attempt, since the PLMN has been added to the FPLMN list earlier and the UE (100) cannot differentiate that in same cell some part UE is allowed to access the network and some other part is forbidden. Thus, forbidden the PLMN mechanism as discussed in the prior art needs to be revisited and there is a need to define a mechanism in which the UE (100) can re-attempt on this PLMN due to possibility of the mobility of the UE (100).

Further, once the UE (100) determines its physical location (for example: which lies outside the country where the CN of the current PLMN/serving network is located) i.e., this is the area which is not supposed to be served by the current serving PLMN including the case of global PLMN or PLMN with the MCC of the country, the UE (100) may send a Registration Request (through any non-access stratum (NAS) or access stratum (AS) signaling) to the PLMN belonging to the MCC mapped to the UE's physical location. In such a scenario, the network may reject the registration request of the UE (100) and determine that the UE (100) is not in the area where it is supposed to be served. However, there might be a possibility that the network may wrongly determine the physical location of the UE (100), which leads to a false registration reject. Based on the rejection of the registration request, the UE (100) may not try on any of the PLMN(s) corresponding to the MCC of the physical location determined by the UE (100) (wherever the term MCC of the physical location is used herein, this also corresponds to global PLMN which is configured along with the area in which the PLMN should serve the UE (100)), which may further affect the UE's PLMN search procedure on identifying its physical location. Thus, the conventional approaches do not define to what extent and under which conditions the UE (100) has to rely on the reject provided by the serving PLMN, to determine the country of its physical location.

Further, once the UE (100) determines its physical location, the UE (100) may send the Registration Request to the PLMN belonging to the MCC mapped to the UE's physical location. However, if no PLMN with same MCC is able to provide service to the UE (100) or there are no such PLMN's with MCC corresponding to the current location of the UE (100), and if some Global/Shared PLMN ids; for example, with MCC=9xx are present in the same area along with PLMN ids having MCC's belonging to other countries, then it is not clear on which PLMN the UE (100) has to try first in order to acquire the satellite communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and a UE for handling communication in a wireless network.

Another aspect of the disclosure is to disclose that when a network determines that a PLMN not allowed to operate at the present UE location, the network provides a cause value at least one of Geographical area (Minimum distance from current UE location) and a timer minimum value (Minimum timer value).

Another aspect of the disclosure is to disclose that the UE will add a PLMN-ID and geographical area, timer instance value in a list of "PLMNs not allowed to operate at the present UE location". When the UE is in that geographical area, the UE will not select the respective PLMN-ID and register with network. While the timer is running, the UE will not select the respective PLMN-ID and attempt registration on that PLMN-ID.

Another aspect of the disclosure is to disclose that the UE will perform PLMN selection to select some other PLMN and register on new another PLMN. Each PLMN ID entry shall be removed if for the entry a) the UE successfully registers to the PLMN stored in the entry, or b) the timer instance associated with the entry expires.

Another aspect of the disclosure is to disclose that the network can trigger deregistration without any NAS message triggered from the UE, example when a handover (HO) procedures are executed. The UE can trigger deregistration procedure, or UE can perform local release with current PLMN, perform PLMN selection to camp and register onto another PLMN which allows UE to register with the network.

Another aspect of the disclosure is to disclose that the when reject is given to the UE, an area is also indicate which is provided in the form geographical co-ordinates, the UE determines its current location using for e.g. global positioning system (GPS) and see it if is part of the area given by the network if it is part of that area UE will not attempt registration on that PLMN, Perform PLMN selection to camp and register onto the another PLMN which allows UE to register with the network.

Additional aspects will be set forth in part in the description which follows and, in part, will be apparent from the description, or may be learned by practice of the presented embodiments.

In accordance with an aspect of the disclosure, a method for handling communication in a wireless network is provided. The method includes receiving, by a user equipment (UE), a non-access stratum (NAS) message indicating that the UE is not permitted to access a first public land mobile network (PLMN) over a satellite communication along with one or both of the geographical indication or a timer indication from the first PLMN. Further, the method includes determining, by the UE, at least one of a geographical area based on the received geographical indication or a timer value based on the timer indication. Further, the method includes storing, by the UE, at least one of the geographical area or the timer value along with a first PLMN identifier (ID) in the UE. Further, the method includes starting, by the UE, a timer with the timer value. Further, the method includes determining by the UE, at least one of that the UE is not allowed to access the first PLMN in the determined geographical area or the expiry of the timer. Further, the method includes performing by the UE, a PLMN selection and registration procedure on a second PLMN based on the determination.

In an embodiment, the UE receives the NAS message, in response to attempting a registration procedure, a service request procedure, or a NAS procedure on the first PLMN, or in a case in which the UE is already in a registered state over the satellite communication.

In an embodiment, the UE does not select and performs the registration procedure on the first PLMN over satellite access in a case in which the timer is running.

In an embodiment, the UE does not select and performs the registration procedure on the first PLMN over satellite access in a case in which the UE is in the determined geographical area.

In an embodiment, the UE determines at least one of the geographical area or the timer value by considering the at least one of the geographical indication or the timer indication as minimum values.

In an embodiment, the UE determines at least one of the geographical area or the timer value by an implementation dependent mechanism in a case in which the geographical indication or the timer indication are not received in the NAS message.

In an embodiment, the NAS message is one of a registration reject message, a registration accept message, a service reject message, or a deregistration request message.

In an embodiment, the UE deletes the timer value and the stored information of PLMN ID and corresponding geographical area in a case in which the UE successfully registers on the first PLMN for a normal service, in a case in which the UE is switched OFF and ON or in a case in which a Universal Subscriber Identity Module (USIM) associated with the UE is removed.

In accordance with another aspect of the disclosure, a method for handling communication in a wireless network is provided. The method includes receiving, by a first PLMN, one of a registration procedure, a service request procedure, a NAS procedure from a UE, or detecting that the UE is already in a registered state over a satellite communication. Further, the method includes detecting, by the PLMN, that the PLMN is not allowed to operate at a present UE location based on one of the received registration procedure, the received service request procedure, the received NAS procedure from the UE or in response to detecting that the UE is already in the registered state over the satellite communication. Further, the method includes sending, by the PLMN, a NAS message to the UE based on the detection. The NAS message indicates that the UE is not permitted to access the first PLMN over a satellite communication along with at least one of a geographical indication or a timer indication.

In accordance with another aspect of the disclosure, a method for handling communication in a wireless network is provided. The method includes detecting, by a first network, that a PLMN is not allowed to operate at a present UE location, in a case in which a UE is in a connected state. Further, the method includes sending, by the first network, at least one of a detach request, a deregistration request, or a radio resource control (RRC) connection release to the UE through at least one of a NAS signaling and access stratum (AS) signaling based on the detection.

In yet another embodiment, the method includes performing, by the first network, handover of the UE to a target core network of the first network or a second network in a new serving area based on detecting that the PLMN is not allowed to operate at the present UE location.

In accordance with another aspect of the disclosure, a UE for handling communication in a wireless network is provided. The UE includes a satellite communication handling controller coupled with a processor and a memory. The satellite communication handling controller is configured to receive a NAS message indicating that the UE is not permitted to access a first PLMN over a satellite communication along with at least one of a geographical indication and a timer indication from the first PLMN. Further, the satellite communication handling controller is configured to determine at least one of a geographical area based on the received geographical indication or a timer value based on the timer indication. Further, the satellite communication handling controller is configured to store at least one of the geographical area or the timer value along with a first PLMN ID in the UE. Further, the satellite communication handling controller is configured to start a timer with the timer value. Further, the satellite communication handling controller is configured to determine that the UE is not allowed to access the first PLMN at least one of in the determined geographical area or the expiry of the timer. Further, the satellite communication handling controller is configured to perform a PLMN selection and registration procedure on a second PLMN.

In accordance with another aspect of the disclosure, a PLMN for handling communication in a wireless network is provided. The PLMN includes a satellite communication handling controller coupled with a processor and a memory. The satellite communication handling controller is configured to receive one of a registration procedure, a service request procedure, a NAS procedure from a UE or detect that the UE is already in a registered state over a satellite communication. Further, the satellite communication handling controller is configured to detect that the PLMN is not allowed to operate at the present UE location based on one of the received registration procedure, the received service request procedure, the received NAS procedure from the UE or in response to detecting that the UE is already in the registered state over the satellite communication. Further, the satellite communication handling controller is configured to send a NAS message to the UE based on the detection that the PLMN is not allowed to operate at a present UE location. The NAS message indicates that the UE is not permitted to access the PLMN over a satellite communication along with at least one of a geographical indication or a timer indication.

In accordance with another aspect of the disclosure, a network for handling communication in a wireless network is provided. The network includes a satellite communication handling controller coupled with a processor and a memory. The satellite communication handling controller is configured to detect that a PLMN is not allowed to operate at a present UE location, in a case in which a UE is in a connected state. In an embodiment, the satellite communication handling controller is configured to send at least one of a detach request, a deregistration request, or an RRC connection release to the UE through at least one of a NAS signaling or AS signaling based on the detection. In another embodiment, the satellite communication handling controller is configured to perform handover of the UE to a target core network in a new serving area based on detecting that the PLMN is not allowed to operate at the present UE location.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, and 8C are example sequence diagrams depicting extent and conditions under which the UE has to rely on a reject provided by a serving PLMN, wherein the reject indicates that the UE is not in a Mobile Country Code (MCC) of the serving PLMN, according to various embodiments of the disclosure;

The same reference numerals are used to represent the same elements throughout the drawings.

DETAILED DESCRIPTION

Figure 1:
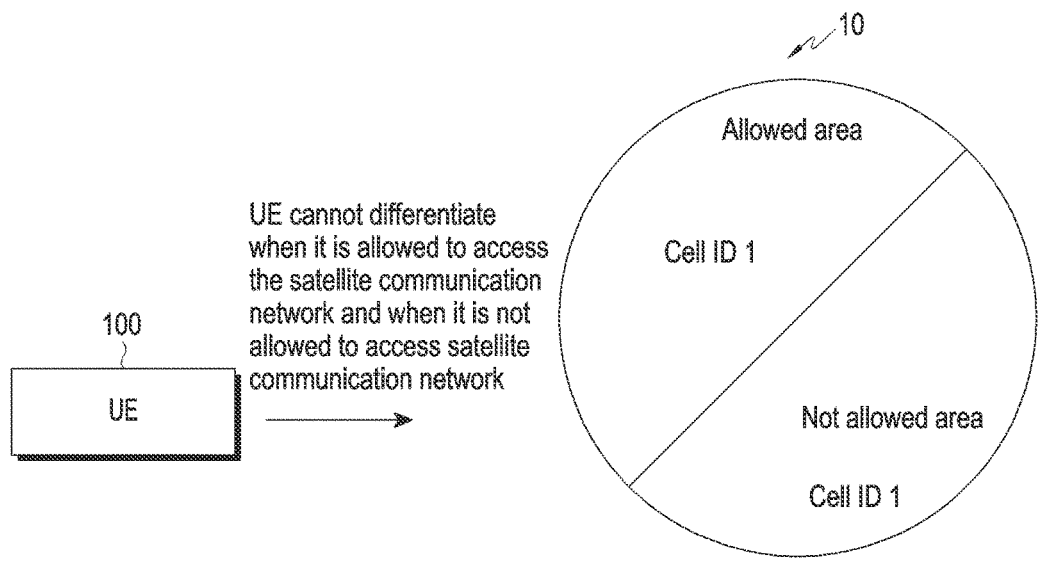
FIG. 1 is an example scenario in which a user equipment (UE) cannot differentiate when the UE is allowed to access the satellite communication network and when the UE is not allowed to access satellite communication network, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly, the embodiments herein provide methods for handling communication in a wireless network. The method includes receiving, by a UE, a NAS message indicating that the UE is not permitted to access a first PLMN over a satellite communication along with at least one of a geographical indication and a timer indication from the first PLMN. Further, the method includes determining, by the UE, at least one of a geographical area based on the received geographical indication and a timer value based on the timer indication. Further, the method includes storing, by the UE, at least one of the geographical area and the timer value along with a first PLMN ID in the UE. Further, the method includes starting, by the UE, a timer with the timer value. Further, the method includes determining by the UE, that the UE is not allowed to access the first PLMN at least one of in the determined geographical area and till the expiry of the timer. Further, the method includes performing by the UE, a PLMN selection and registration procedure on a second PLMN based on the determination.

In an embodiment, when the network determines that the PLMN not allowed to operate at the present UE location, the network provides a cause value at least one of Geographical area (Minimum distance from current UE location) and a timer minimum value (Minimum timer value). The UE will add the PLMN-ID and geographical area, timer instance value in the List of "PLMNs not allowed to operate at the present UE location". When the UE is in that geographical area, the UE will not select the respective PLMN-ID and register with network. While the timer is running, the UE will not select the respective PLMN-ID and attempt registration on that PLMN-ID. The timer value is determined based on the assumption that if UE is mobile it will take minimum that much duration for it to go out of the area where UE is not allowed to operate. But in practice UE may not move, timer may expire and UE may end up attempting from same location in such a case network can keep increasing the minimum timer value indicated to the UE so that signaling load on network can be reduced.

In an embodiment, the UE will perform PLMN selection to select some other PLMN and register on new another PLMN. Each PLMN ID entry shall be removed if for the entry a) the UE successfully registers to the PLMN stored in the entry, or b) the timer instance associated with the entry expires.

In an embodiment, the network can trigger deregistration without any NAS message triggered from the UE, when the HO procedures are executed. The UE can trigger deregistration procedure, or UE can perform local release with current PLMN, Perform PLMN selection to camp and register onto the PLMN which allows UE to register with the network.

In an embodiment, when reject is given to the UE, an area is also indicate which is provided in the form geographical co-ordinates or the distance from current location, the UE determines its current location using for e.g. GPS and see it if is part of the area given by the network, for e.g. the network can indicate minimum distance as 1 km, then the UE will determine its current location (where it received the NAS message indicating UE is not allowed to operate) and for the distance of 1 km the UE will determine that as a geographical area. If the UE is part of that geographical area then, the UE will not attempt registration on that PLMN, performs PLMN selection to camp and registers onto the another PLMN which allows UE to register with the network. As exact physical geographical area is determined the UE has no confusion where it can access or not access the network for satellite communication. The network can also trigger deregistration without any NAS message triggered from the UE, when the HO procedures are executed. The UE can trigger deregistration procedure, or the UE can perform local release with current PLMN, performs PLMN selection to camp and register onto the other PLMN which allows UE to register with the network.

Referring now to the drawings, and more particularly to FIGS. 2, 3A, 3B, 4 to 6, 7A to 7C, 8A to 8C, 9, and 10, where similar reference characters denote corresponding features consistently throughout the figures, there are shown at least one embodiment.

Figure 2:
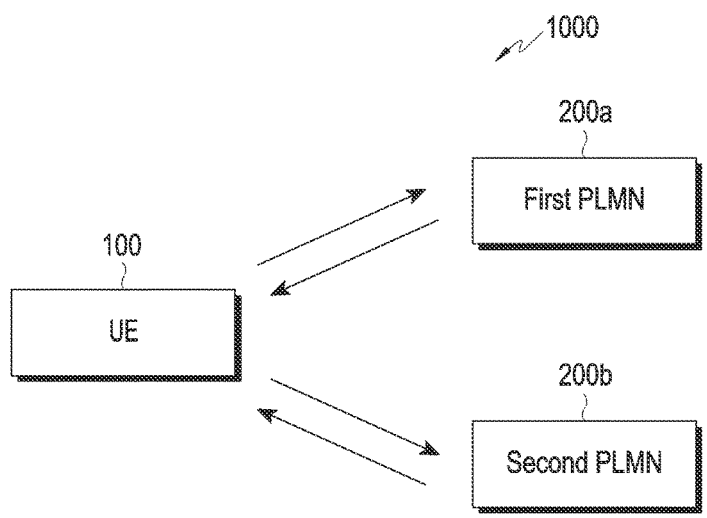
FIG. 2 is an overview of a wireless network for handling communication, according to an embodiment of the disclosure.

FIG. 2 is an overview of a wireless network (1000) for handling communication, according to an embodiment of the disclosure.

Referring to FIG. 2, the wireless network (1000) can be, for example, but not limited to a fifth generation (5G) network, a sixth generation (6G) network, a satellite communication network and an open radio access network (O-RAN). In an embodiment, the wireless network (1000) includes a UE (100), a first PLMN (200a) and a second PLMN (200b). The UE (100), the first PLMN (200a) and the second PLMN (200b) are communicated with each other through a wired communication/wireless communication. The UE (100) can be, for example, but not limited to a smart phone, a laptop, a tablet, an immersive device, a virtual reality device, a foldable device, an Internet of things (IoT) device, or any other device capable of communicating using the wireless network (1000).

The UE (100) receives a NAS message indicating that the UE (100) is not permitted to access the first PLMN (200a) over a satellite communication network along with a geographical indication and a timer indication from the first PLMN (200a). In one example, the UE (100) receives the NAS message in response to attempting a registration procedure or a service request procedure or a NAS procedure on the first PLMN (200a) over the satellite communication network or if the UE (100) is already in a registered state over the satellite communication network. The NAS message can be, for example, but not limited to a registration reject message, a registration accept message, a service reject message, and a deregistration request message.

Further, the UE (100) determines a geographical area based on the received geographical indication and a timer value based on the timer indication and stores the geographical area and the timer value along with a first PLMN identifier (ID). In an embodiment, the UE (100) determines the geographical area and timer value by considering the geographical indication and timer indication as minimum values. In another embodiment, the UE (100) determines the geographical area and the timer value using an implementation dependent mechanism, if the geographical indication and timer indication have not been received in the NAS message.

Further, the UE (100) starts a timer with the timer value and determines that the UE (100) is not allowed to access the first PLMN (200a) in the determined geographical area till the expiry of the timer. Further, the UE (100) performs a PLMN selection and registration procedure on the second PLMN (200b).

In an embodiment, the UE (100) does not select and perform the registration procedure on the first PLMN (200a) over satellite access if the timer is running. In an embodiment, the UE (100) does not select and performs the registration procedure on the first PLMN (200a) over satellite access if the UE (100) is in the determined geographical area. In an example, the UE (100) can treat the running timer value and the geographical area as two different parameters one of them may be is determined by the UE (100) and another one is not determined. The UE (100) uses only one parameter to determine whether to attempt registration on the first PLMN as described in this embodiment. For example, any one or more combinations can occur:

The network has provided only timer indication and not the geographical indication and the UE (100) chooses to determine only timer value and not the geographical area;

The network has only provided geographical indication and not the timer indication and the UE (100) chooses to determine only geographical area and not the timer value; or The case when the network has not provided any indication and the UE (100) chooses to determine only timer value based on UE implementation; or The case when the network has not provided any indication and the UE (100) chooses to determine only timer value based on UE implementation; or The case when the network has not provided any indication and the UE chooses to determine both timer value and geographical area based on UE implementation.

Further, the UE (100) deletes the stored information of PLMN ID and corresponding geographical area and the timer value when the UE (100) successfully registers on the first PLMN (200a) for a normal service or when the UE (100) is switched OFF and ON or when a Universal Subscriber Identity Module (USIM) associated with the UE (100) is removed.

Figure 3A:
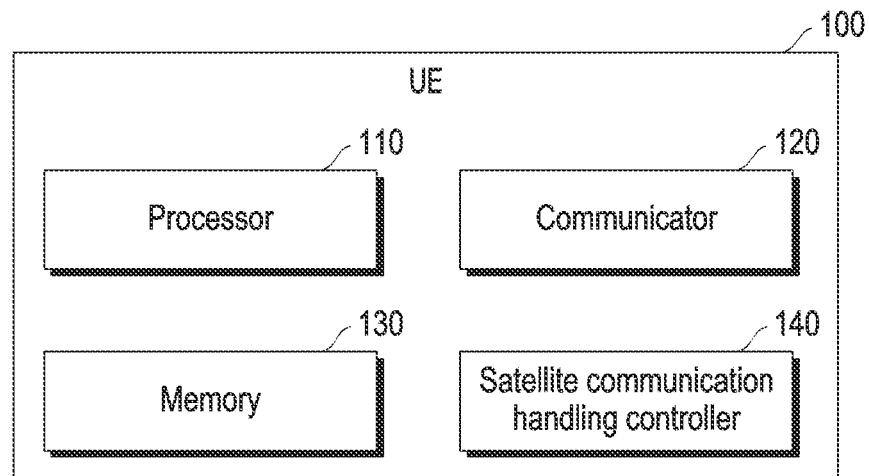
FIG. 3A shows various hardware components of a UE, according to an embodiment of the disclosure.

FIG. 3A shows various hardware components of the UE (100), according to an embodiment of the disclosure.

Referring to FIG. 3A, in an embodiment, the UE (100) includes a processor (110), a communicator (120), a memory (130), and a satellite communication handling controller (140). The processor (110) is coupled with the communicator (120), the memory (130) and the satellite communication handling controller (140).

The satellite communication handling controller (140) may be configured to receive the NAS message indicating that the UE (100) is not permitted to access the first PLMN (200a) over the satellite communication along with the geographical indication and the timer indication from the first PLMN (200a). The satellite communication handling controller (140) may be configured to receive the NAS message in response to attempting the registration procedure or the service request procedure or the NAS procedure on the first PLMN (200a) or if the UE (100) is already in the registered state over the satellite communication.

Further, the satellite communication handling controller (140) may be configured to determine the geographical area based on the received geographical indication and the timer value based on the timer indication. The satellite communication handling controller (140) may be configured to store the geographical area and the timer value along with the first PLMN ID at the UE (100). The satellite communication handling controller (140) may be configured to start the timer with the timer value and determine that the UE (100) is not allowed to access the first PLMN (200a) at least one of in the determined geographical area and till the expiry of the timer. The satellite communication handling controller (140) may be configured to perform the PLMN selection and registration procedure on the second PLMN (200b) based on the determination.

In an embodiment, the satellite communication handling controller (140) does not select and performs the registration procedure on the first PLMN (200a) over satellite access if the timer is running. In an embodiment, the satellite communication handling controller (140) does not select and performs the registration procedure on the first PLMN (200a) over satellite access if the UE (100) is in the determined geographical area. In an embodiment, the satellite communication handling controller (140) may determine the geographical area and the timer value by an implementation dependent mechanism if the geographical indication and timer indication are not received in the NAS message.

The satellite communication handling controller (140) may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) may be configured to execute instructions stored in the memory (130) and to perform various processes. The communicator (120) may be configured for communicating internally between internal hardware components and with external devices via one or more networks. The memory (130) also may store instructions to be executed by the processor (110). The memory (130) may include non-volatile storage elements. Examples of such non-volatile storage elements may include magnetic hard disks, optical discs, floppy disks, flash memories, or forms of erasable programmable read only memories (EPROM) or electrically erasable and programmable ROM (EEPROM) memories. In addition, the memory (130) may, in some examples, be considered a non-transitory storage medium.

The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although FIG. 3A shows various hardware components of the UE (100) but it is to be understood that other embodiments are not limited thereon. In other embodiments, the UE (100) may include a lesser or greater number of components. Further, the labels or names of the components are used only for illustrative purpose and does not limit the scope of the disclosure. One or more components can be combined together to perform same or substantially similar function in the UE (100).

Figure 3B:
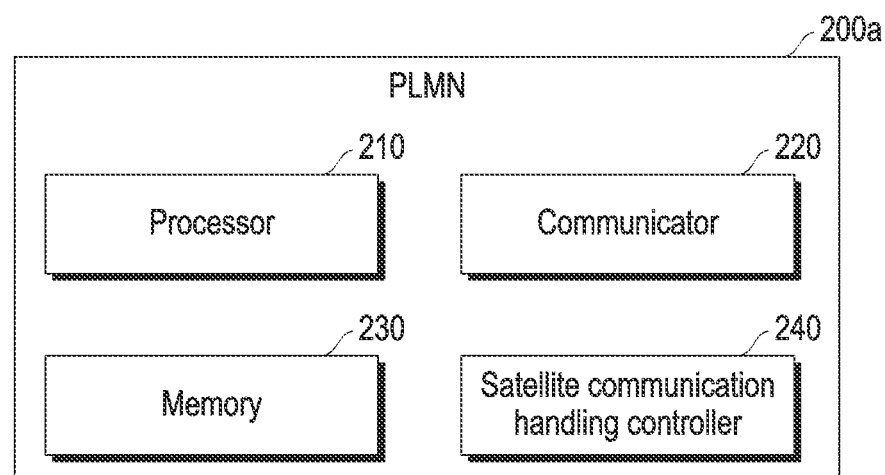
FIG. 3B shows various hardware components of a public land mobile network (PLMN), according to an embodiment of the disclosure.

FIG. 3B shows various hardware components of the first PLMN (200a), according to an embodiment of the disclosure.

Referring to FIG. 3B, in an embodiment, the first PLMN (200a) includes a processor (210), a communicator (220), a memory (230), and a satellite communication handling controller (240). The processor (210) is coupled with the communicator (220), the memory (230) and the satellite communication handling controller (240).

The satellite communication handling controller (240) may be configured to receive the one of the registration procedure, the service request procedure, the NAS procedure from the UE (100) or detect that the UE (100) is already in the registered state over the satellite communication. Further, the satellite communication handling controller (240) may be configured to detect that the first PLMN (200a) is not allowed to operate at a present UE location based on one of the received registration procedure, the received service request procedure, the received NAS procedure from the UE (100) or in response to detecting that the UE (100) is already in the registered state over the satellite communication. Based on the detection, the satellite communication handling controller (240) may be configured to send the NAS message to the UE (100). The NAS message indicates that the UE (100) is not permitted to access the first PLMN (200a) over the satellite communication along with at least one of the geographical indication and the timer indication.

The satellite communication handling controller (240) may be configured to detect that the PLMN is not allowed to operate at the present UE location, when the UE (100) is in the connected state. In an embodiment, the satellite communication handling controller (240) may be configured to send at least one of a detach request, the deregistration request and the RRC connection release to the UE (100) through at least one of the NAS signaling and the AS signaling based on the detection. In another embodiment, the satellite communication handling controller (240) may be configured to perform handover of the UE (100) to the target core network in a new serving area based on the detection.

The satellite communication handling controller (240) may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) may be configured to execute instructions stored in the memory (230) and to perform various processes. The communicator (220) may be configured for communicating internally between internal hardware components and with external devices via one or more networks. The memory (230) also may store instructions to be executed by the processor (210). The memory (230) may include non-volatile storage elements. Examples of such non-volatile storage elements may include magnetic hard disks, optical discs, floppy disks, flash memories, or forms of EPROM or EEPROM memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although FIG. 3B shows various hardware components of the first PLMN (200a) but it is to be understood that other embodiments are not limited thereon. In other embodiments, the first PLMN (200a) may include a lesser or greater number of components. Further, the labels or names of the components are used only for illustrative purpose and does not limit the scope of the disclosure. One or more components can be combined together to perform same or substantially similar function in the first PLMN (200a). Also, FIG. 3B shows various hardware components of the first PLMN (200a), FIG. 3B and the description thereof is equally applicable to the second PLMN (200b).

Figure 4:
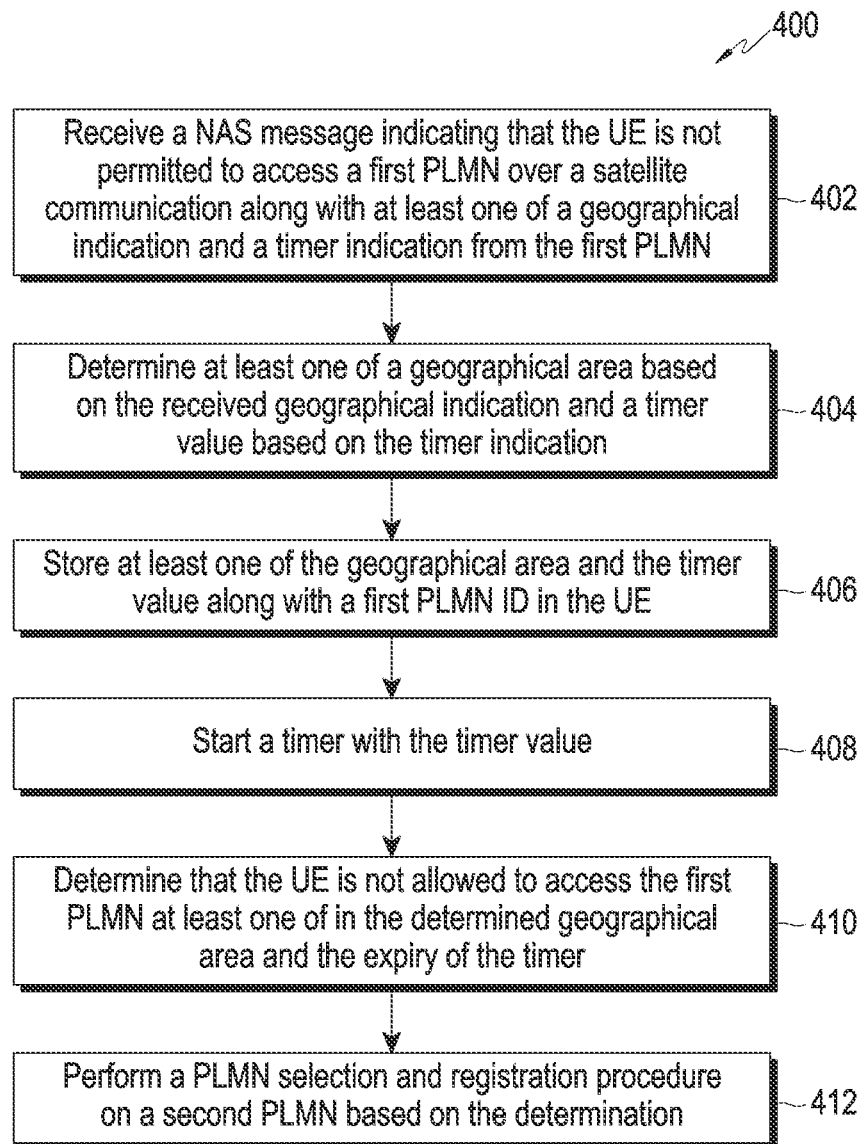
FIG. 4 is a flowchart illustrating a method, implemented by the UE, for handling communication in the wireless network, according to an embodiment of the disclosure.

FIG. 4 is a flowchart (400) illustrating a method, implemented by the UE (100), for handling communication in the wireless network (1000), according to an embodiment of the disclosure. The operations (402-412) are performed by the satellite communication handling controller (140).

Referring to FIG. 4, at operation 402, the method may include receiving the NAS message indicating that the UE (100) is not permitted to access the first PLMN (200a) over the satellite communication along with at least one of the geographical indication and the timer indication from the first PLMN (200a). At operation 404, the method may include determining at least one of the geographical area based on the received geographical indication and the timer value based on the timer indication. At operation 406, the method may include storing at least one of the geographical area and the timer value along with the first PLMN ID at the UE (100).

At operation 408, the method may include starting the timer with the timer value. At operation 410, the method may include determining that the UE (100) is not allowed to access the first PLMN (200a) at least one of in the determined geographical area and till the expiry of the timer. At operation 412, the method may include performing the PLMN selection and registration procedure on the second PLMN (200b) based on the determination.

Figure 5:
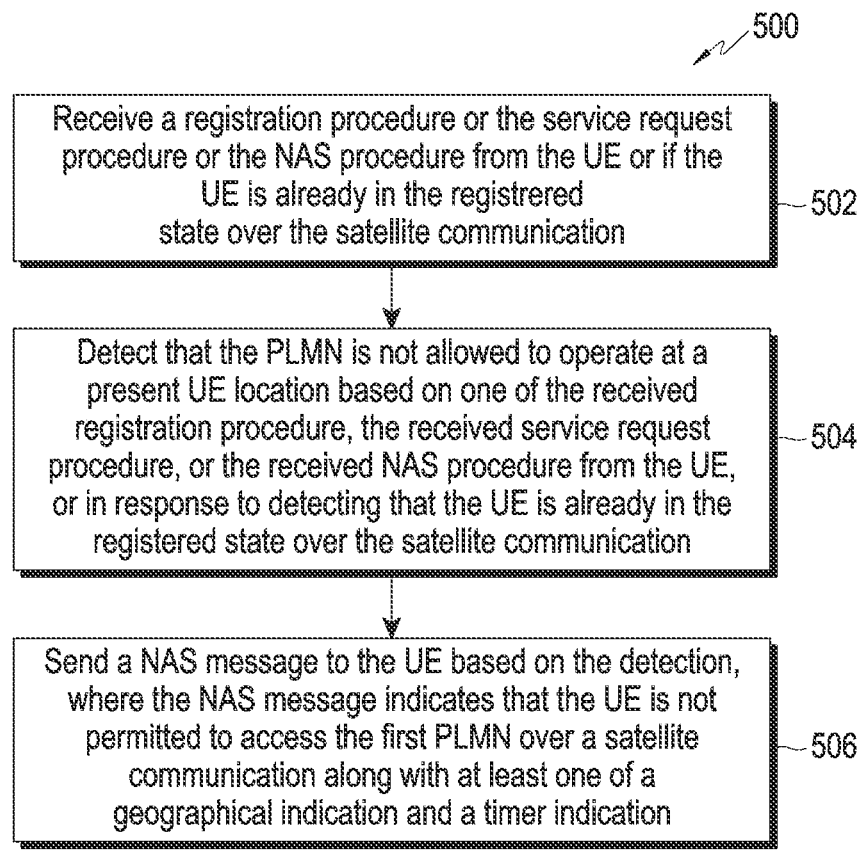
FIG. 5 is a flowchart illustrating a method, implemented by the PLMN, for handling communication in the wireless network, according to an embodiment of the disclosure.

FIG. 5 is a flowchart (500) illustrating a method, implemented by the PLMN (200a), for handling communication in the wireless network (1000), according to an embodiment of the disclosure. The operations (502 and 504) are performed by the satellite communication handling controller (240).

Referring to FIG. 5, at operation 502, the method may include receiving the registration procedure or the service request procedure or the NAS procedure from the UE (100) or if the UE (100) is already in the registered state over the satellite communication. At operation 504, the method may include detecting that the PLMN (200a) is not allowed to operate at the present UE location based on one of the received registration procedure, the received service request procedure, the received NAS procedure from the UE (100)

or in response to detecting that the UE (100) is already in the registered state over the satellite communication.

At operation 506, the method may include sending the NAS message to the UE (100) based on the detection, wherein the NAS message indicates that the UE (100) is not permitted to access the first PLMN (200*a*) over a satellite communication along with at least one of the geographical indication and the timer indication.

Figure 6:
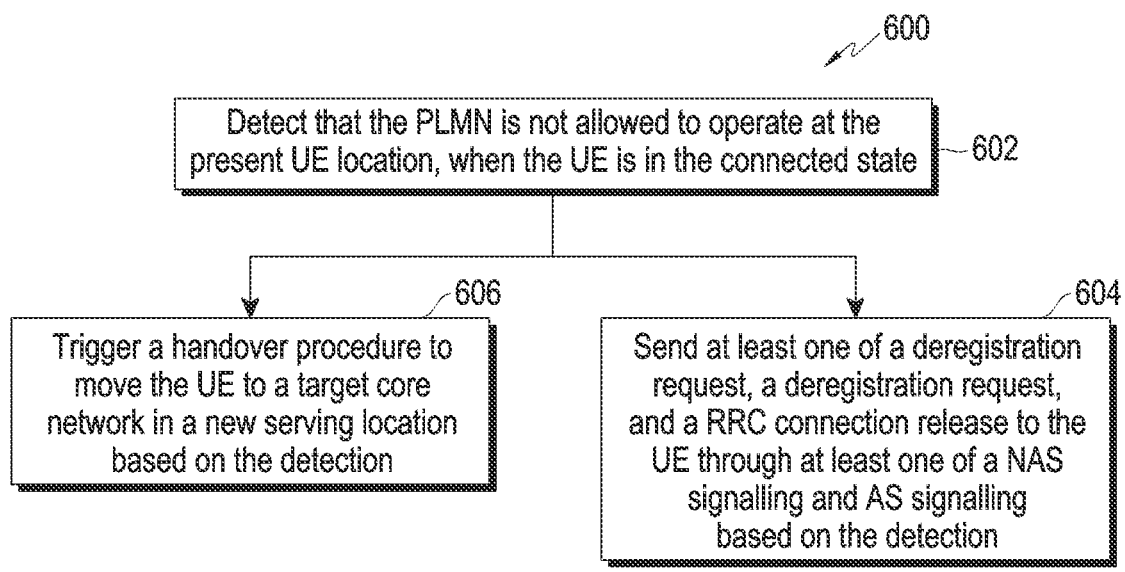
FIG. 6 is a flowchart illustrating a method, implemented by the network, for handling communication in the wireless network, according to an embodiment of the disclosure.

FIG. 6 is a flowchart (600) illustrating a method, implemented by the network, for handling communication in the wireless network (1000), according to an embodiment of the disclosure. The operations (602-606) are performed by the satellite communication handling controller (240).

Referring to FIG. 6, at operation 602, the method may include detecting that the PLMN is not allowed to operate at the present UE location, when the UE (100) is in the connected state. In an embodiment, at operation 604, the method may include sending at least one of the detach request, the deregistration request and the RRC connection release to the UE (100) through at least one of the NAS signaling and the AS signaling based on the detection. In another embodiment, at operation 606, the method may include performing the handover of the UE (100) to a target core network in a new serving location based on the detection.

Figure 7A:
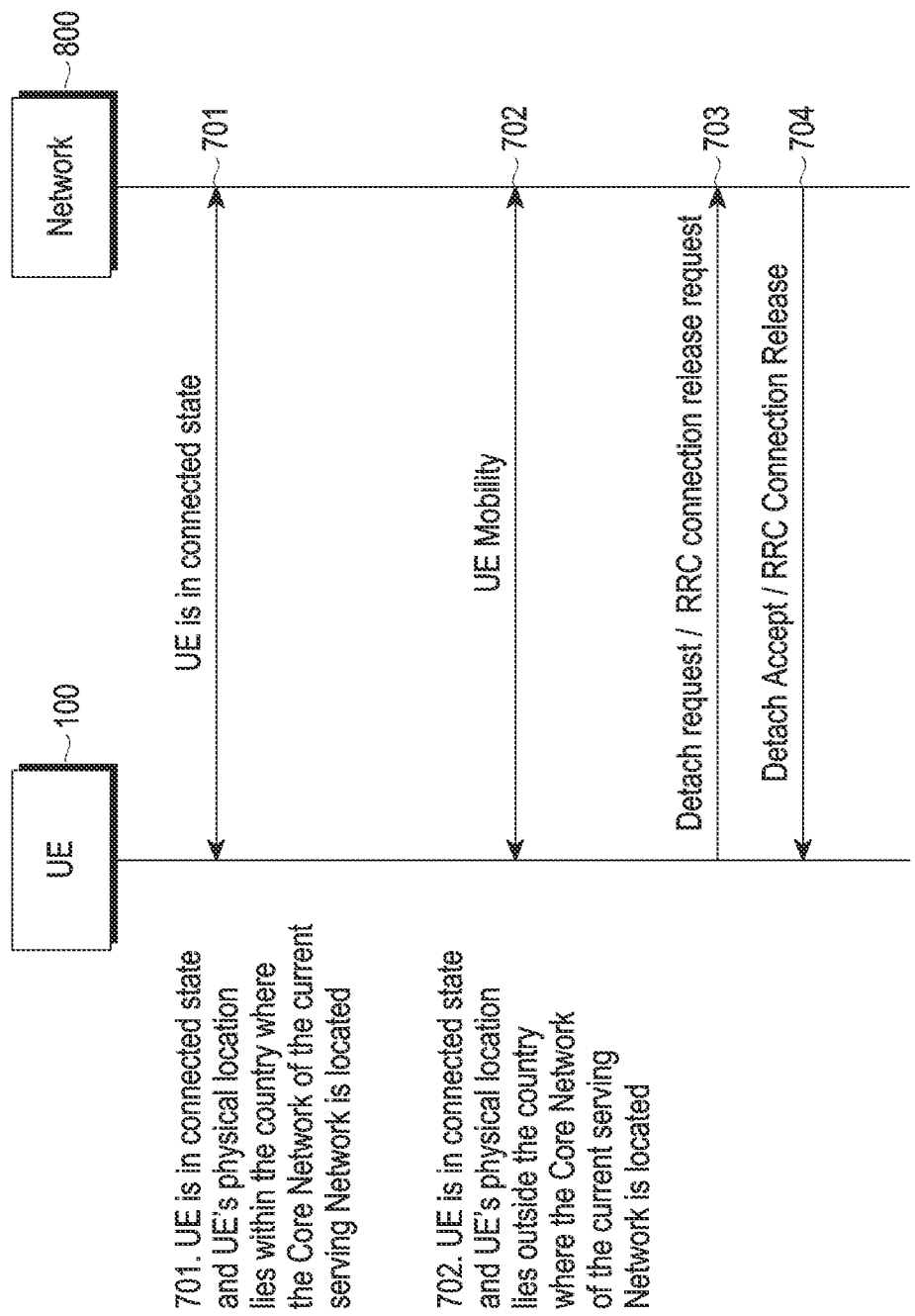
FIGS. 7A, 7B, and 7C are example sequence diagrams depicting behavior of the UE to access satellite communication, when the UE is in a connected state and the UE moves outside a current country area, according to various embodiments of the disclosure.
Figure 7B:
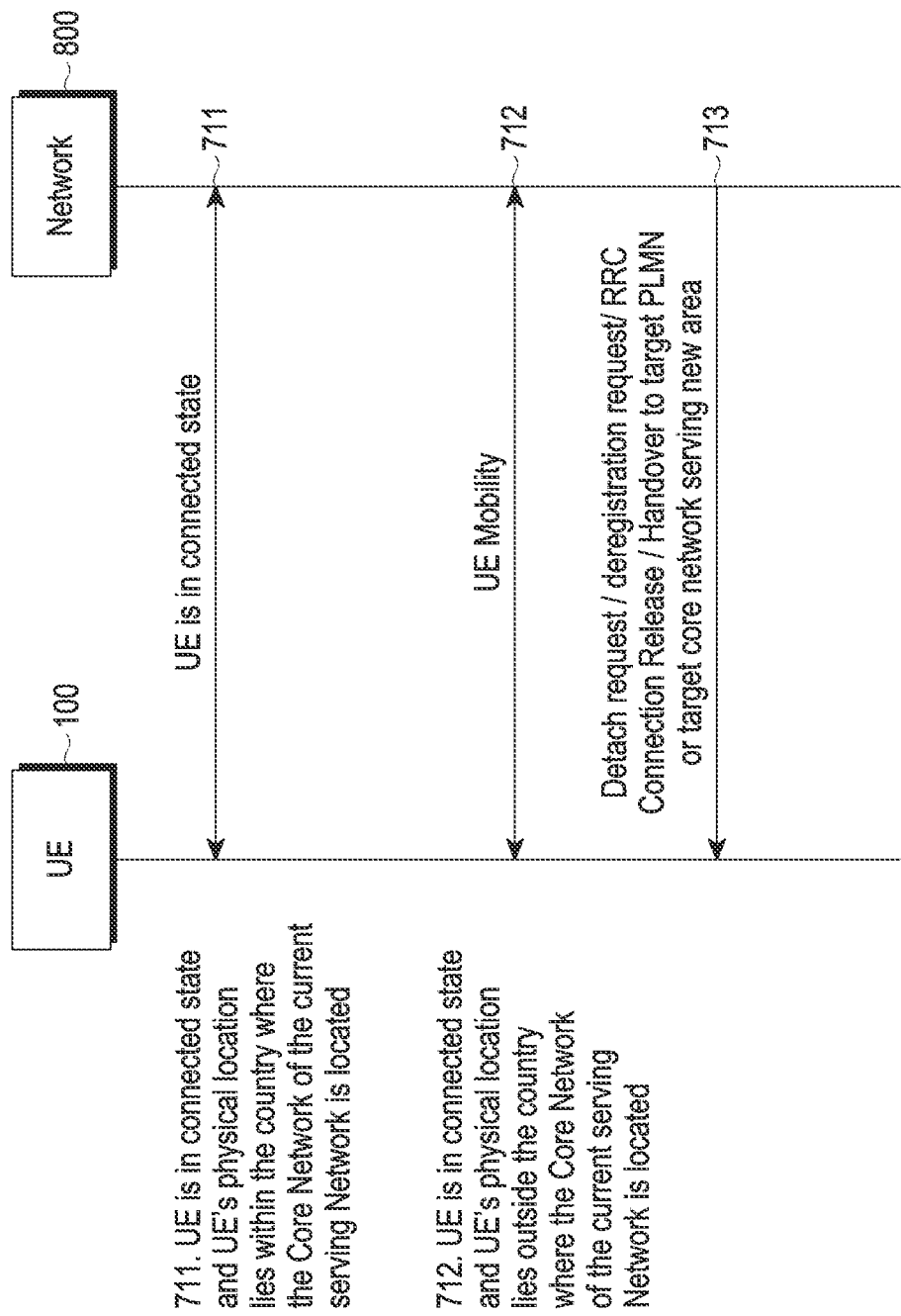
Figure 7C:
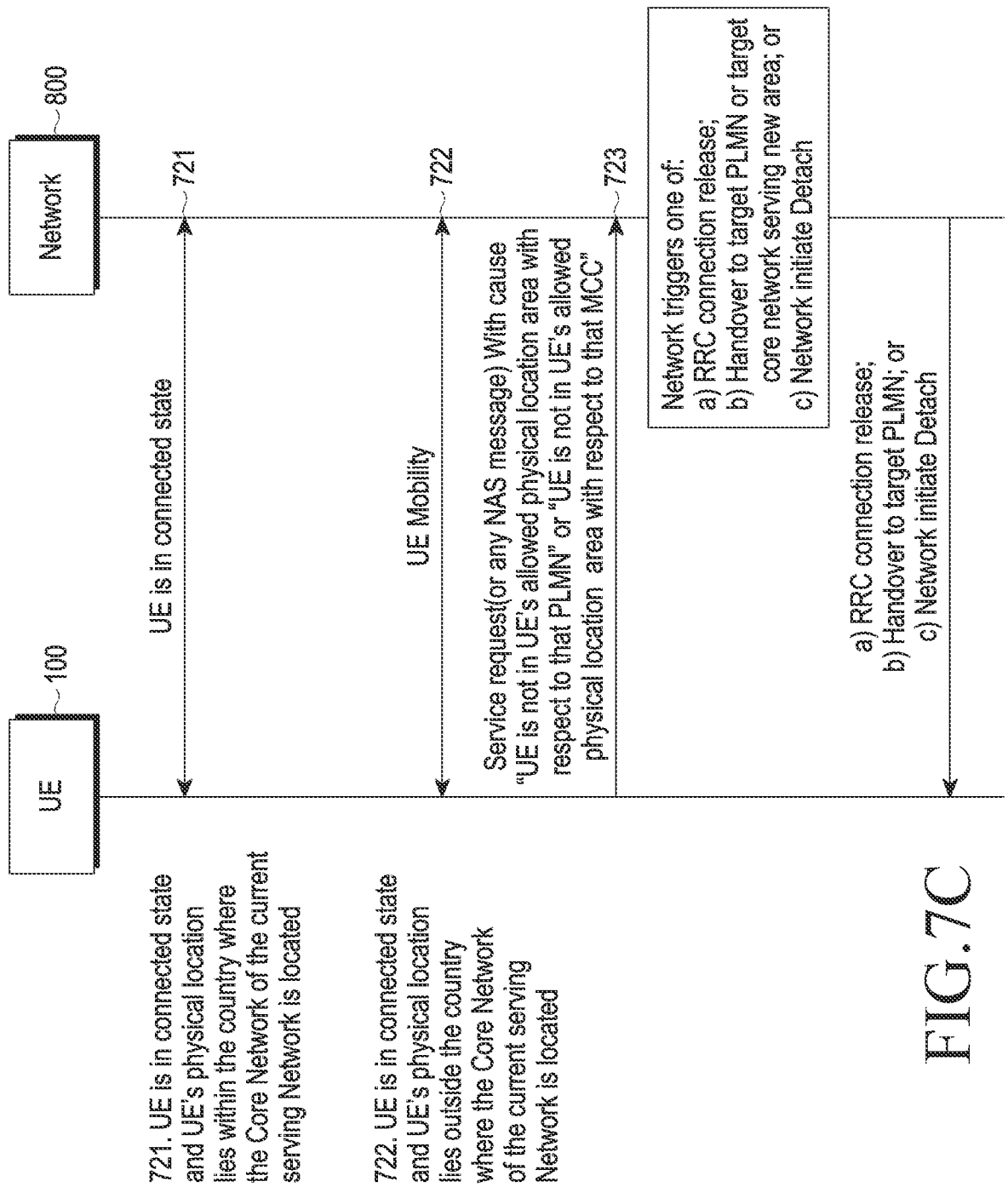

FIGS. 7A, 7B, and 7C are sequence diagrams depicting behavior of the UE to access satellite communication, when the UE (100) is in the connected state and the UE (100) moves outside a current country area, according to various embodiments of the disclosure.

In an embodiment, referring to FIG. 7A, while the UE (100) is in the connected state, if the UE (100) moves to a physical location (or moves in a same cell) which lies outside the country where a Core Network (CN) of a current serving network/Public Land Mobile Network (PLMN) is located, the UE (100) may perform a detach also called as deregistration procedure with the PLMN. In an example, the UE (100) may perform the detach procedure via the AS signaling. In another example, the UE (100) may perform the detach procedure via a NAS signaling.

Referring to FIG. 7A, at operation 701, the UE (100) may be in the connected state and UE's physical location lies within a country where the core network of the current serving network is located. At operation 702, the UE (100) may be in one of the connected state or IDLE state and UE's physical location lies outside the country where the core network of the current serving network is located and the UE (100) is not supposed to get the service their i.e. UE (100) is not supposed to operate there on that core network. At operation 703, the UE (100) may send a detach request or deregistration request message by trigger deregistration procedure or RRC connection release request (by sending NAS signaling connection release request) to the network (800). At operation 704, the network (800) may send the detach/deregistration accept/RRC connection release to the UE (100).

In another embodiment, referring to FIG. 7B, while the UE (100) is in the connected state, if the UE (100) moves to the physical location which lies outside the country where the CN of the current serving network/PLMN is located, the network may initiate the detach (also called as deregistration) procedure with the UE (100). In an example, the network may initiate the detach procedure via the AS signaling. In another example, the UE (100) may initiate the detach procedure via the NAS signaling.

Referring to FIG. 7B, at operation 711, the UE (100) may be in the connected state and UE's physical location lies within the country where the core network of the current serving network is located. At operation 712, the UE (100) may be in the connected state and the UE's physical location lies outside the country where the core network of the current serving network is located. At operation 713, the network (800) may send the detach request/RRC connection release or the core network can trigger handover to target PLMN or target core network serving new area to the UE (100) where UE is allowed to operate. i.e. for e.g. the operator-1 (PLMN-1) may handover the UE (100) to operator-2 (PLMN-2) wherein the PLMN-2 is allowed to serve the UE (100) in the new area UE is currently located.

In another embodiment, referring to FIG. 7C, while the UE (100) is in the connected state or in the IDLE state and when the UE (100) determines that its current physical location lies outside the country, where the CN of the current serving network/PLMN is located, the UE (100) may send a connect release request to the network. In an example, the connect release message may include a service request message or a deregistration request message with a cause. In another example, the connect release message may include any of the old or the new NAS signaling message.

Referring to FIG. 7C, at operation 721, the UE (100) may be in the connected state and UE's physical location lies within the country where the core network of the current serving network is located. At operation 722, the UE (100) may be in the connected state and UE's physical location lies outside the country where the core network of the current serving network is located. At operation 723, the UE (100) may send the service request (or any NAS message) with cause to the network (800). The cause corresponds to the "the UE (100) is not in UE's allowed physical location area with respect to that the PLMN" or "the UE (100) is not in UE's allowed physical location area with respect to that MCC". The network (800) triggers one of: RRC connection release, the handover to target PLMN or target core network serving new area, and network initiate detach (also called as deregistration) procedure.

On receiving the connect release message from the UE, the network triggers/initiates at least one procedure to move the UE (100) into an IDLE mode or Inactive state. In an embodiment, the at least one procedure may include at least one of, a Radio Resource Control (RRC) connection release procedure, a handover procedure to handover the UE (100) to a target PLMN or a target CN serving a new area where providing service to the UE (100) is allowed, a network initiate detach or deregistration procedure, and so on. In an embodiment, the IDLE mode behavior of the UE (100) may be same as an inactive state of the UE (100).

In an embodiment, the UE (100) may perform a local release of the RRC connection optionally after waiting for the network to release the signaling connection for "X" duration of time. The "X" duration can be monitored by the timer by the UE (100).

In another embodiment, while the UE (100) is in the connected state and when the UE (100) determines that its current physical location (for example the UE (100) moves in the same cell) lies outside the country, where the CN of the current serving network/PLMN is located, the network may initiate an RRC connection release procedure to move the UE (100) into the IDLE MODE.

Each of the RRC connection release request/RRC connection release/Detach request includes a cause which indicates to the receiving entity (the network or the UE) that "UE is not in UE's allowed physical location area with respect to the PLMN (where the UE (100) has moved)" or "UE is not in UE's allowed physical location area with respect to the MCC of the PLMN (where the UE (100) has moved)".

The messages names in this embodiment here are only for illustration purpose, this can be any of the NAS or AS messages. Once this NAS message is received, the UE (100) triggers PLMN selection procedure to search and select for the PLMN which is allowed in the current area.

The terminology that "UE determines that its current physical location (i.e., the UE (100) moves in the same cell) lies outside the country, where the CN of the current serving network/PLMN is located" corresponds to: UE (100) is not in UE's allowed physical location area with respect to the PLMN (where the UE (100) has moved)" or "UE (100) is not in UE's allowed physical location area with respect to the MCC of the PLMN (where the UE (100) has moved)".

The PLMN as referred to herein is either PLMN tied to the country with MCC or global PLMN ID.

Figure 8B:
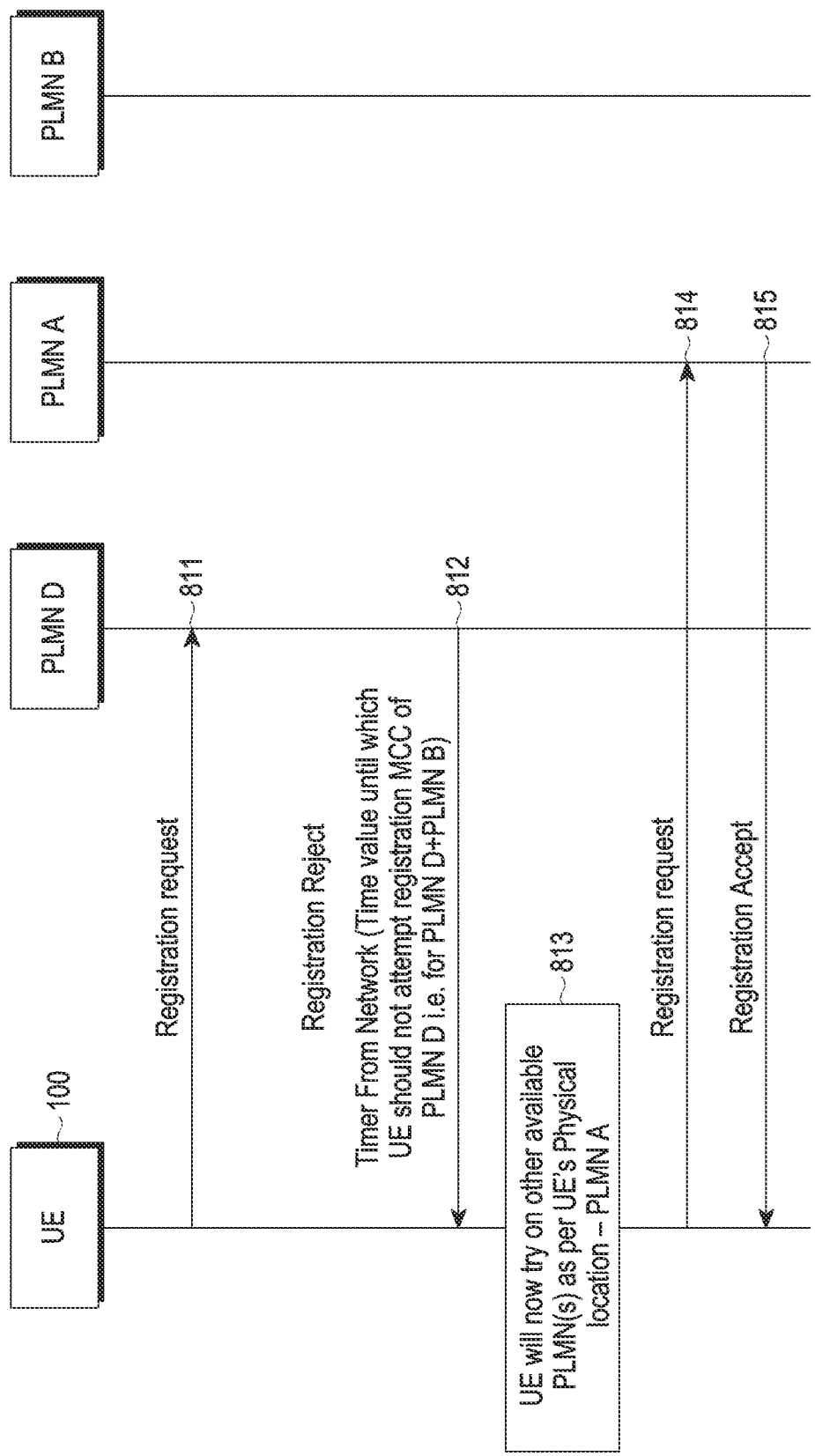
Figure 8C:
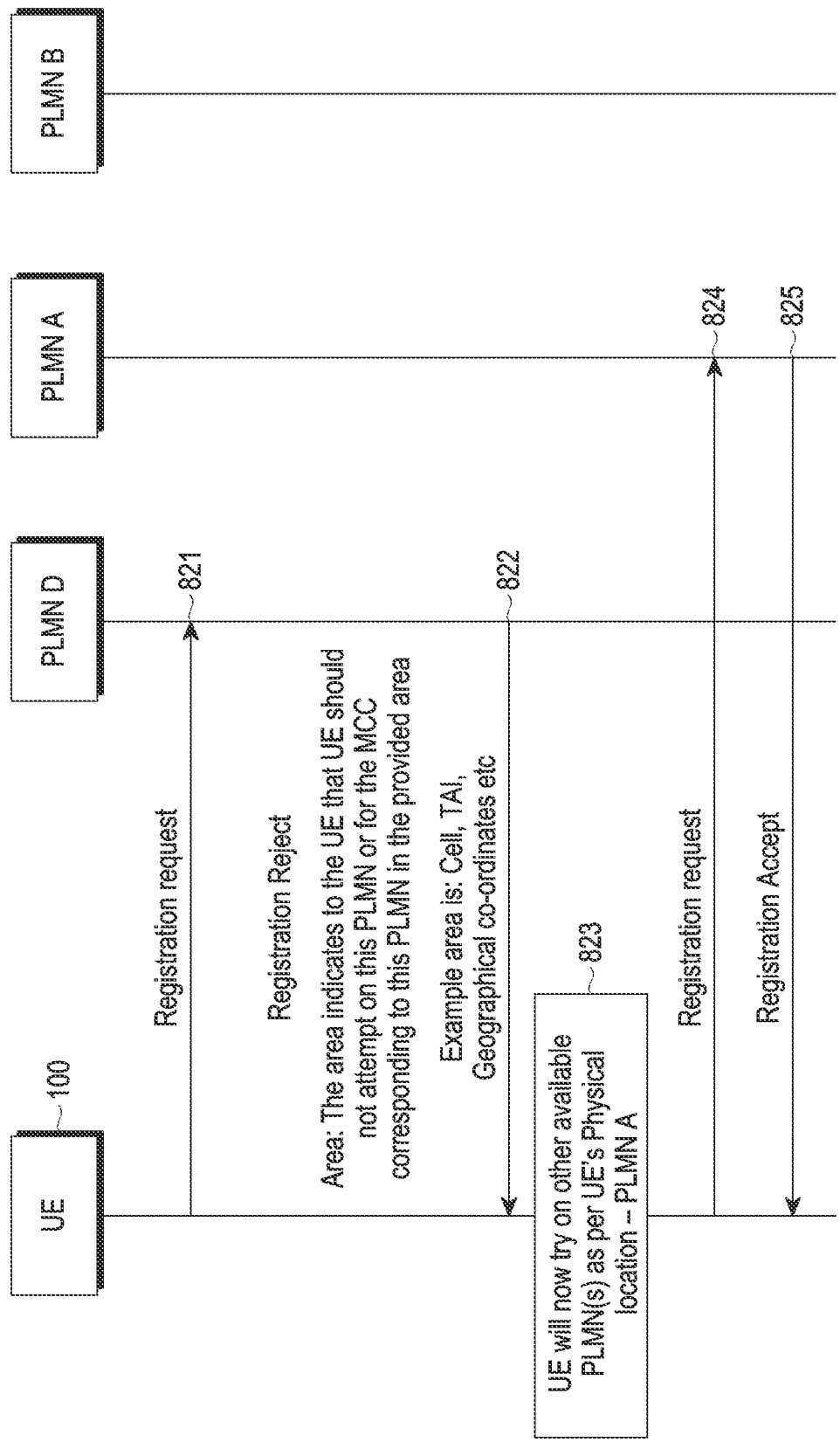

FIGS. 8A, 8B, and 8C are sequence diagrams depicting extent and conditions under which the UE (100) has to rely on a reject provided by a serving Public Land Mobile Network (PLMN), wherein the reject indicates that the UE (100) is not in a Mobile Country Code (MCC) of the serving PLMN, according to various embodiments of the disclosure.

In an embodiment, referring to FIGS. 8A and 8B, if the UE (100) receives the reject for the registration request (or through any NAS or AS signaling messages) and the reject is due to the UE (100) trying to register or is already registered on the PLMN outside the UE's allowed physical location related (i.e., mapped) to the MCC, the UE (100) may register on any one or more other available PLMNs corresponding to the MCC identified by the physical location of the UE (100) (as determined by the UE (100)). In an example, the UE (100) may register on any one or more other available PLMNs through the NAS signaling. In another example, the UE (100) may register on any one or more other available PLMNs through the AS signaling.

The term "PLMNs corresponding to the MCC identified by the physical location of the UE" also corresponds to the global PLMN IDs which are configured to be served in a particular geographical area and for example tagged to particular country or MCC.

In addition, the serving network may provide a timer value along with a reject cause to the UE (100) while rejecting a registration request of the UE (100) and when the reject is due to the UE (100) trying to register on the PLMN outside the MCC of the UE's physical location. The reject of the registration request is indicated to the UE (100) through the NAS or AS signaling. The timer may aid the UE (100) in scenarios, where the UE (100) may be temporarily unable to determine its physical location correctly and may be able to determine its physical location after a while/period of time. While the timer is running, the UE (100) shall not attempt for the registration on the respective PLMN which provided the timer. The UE (100) is allowed to attempt the registration after an expiry of the timer or when the timer is not running. Alternatively, the same timer may be configured in the UE (100) in an implementation dependent mechanism or pre-configured by home or visited network. The timer can be common for all the PLMNs or it can be for individual PLMNs.

Trying on one or more other available PLMN(s) may aid the UE (100) to better determine if the UE's determination of its physical location is correct or if network is providing a false reject. The UE (100) may deem/consider its current physical location is not in the MCC area, if more than one allowable network in the area broadcasting the same MCC have provided same reject cause (i.e., "due to the UE (100) trying to register on the PLMN outside the UE's physical location related (i.e., mapped) to the MCC"). Alternatively, the UE (100) may deem/consider its current physical location is not in the MCC area if all the allowable network(s) in the area broadcasting the same MCC have provided the same reject cause (i.e., "due to UE trying to register on the PLMN outside the UE's physical location related (i.e., mapped) to the MCC"). When the UE (100) deems the current physical location is not in the MCC area due to the reject cause reception from the network, the UE (100) starts the timer. While the timer is running, the UE (100) should not attempt for registration on the respective MCC After the expiry of the timer or when the timer is not running the UE (100) is allowed to initiate NAS or AS signaling on respective PLMNs of that MCC. In an example, the timer may be configured in the UE (100) in the implementation dependent mechanism. In another example, the timer may be provided to the UE (100) by the network (HPLMN or VPLMN) as part of the NAS or AS signaling message.

Referring to FIG. 8A, at operation 801, the UE (100) may send the registration request to the PLMN D. At operation 802, the PLMN D may send the registration reject to the UE (100) in response to the registration request. The registration reject indicates the time value until which the UE (100) should not attempt registration on PLMN D. The timer can bar registration NAS attempt for that particular PLMN. At operation 803, the UE (100) may now try on other available PLMN(s) as per UE's physical location—PLMN A. At operation 804, the UE (100) may send the registration request to the PLMN A. At operation 805, the PLMN A sends the registration accept to the UE (100) in response to the registration request.

Referring to FIG. 8B, at operation 811, the UE (100) may send the registration request to the PLMN D. At operation 812, the PLMN D may send the registration reject to the UE (100) in response to the registration request. The registration reject indicates the time value until which the UE (100) should not attempt registration MCC of PLMN D i.e. for PLMN D+PLMN B. At operation 813, the UE (100) may now try on other available PLMN(s) as per UE's physical location—PLMN A. At operation 814, the UE (100) sends the registration request to the PLMN A. At operation 815, the PLMN A sends the registration accept to the UE (100) in response to the registration request.

Referring to FIG. 8C, at operation 821, the UE (100) may send the registration request to the PLMN D. At operation 822, the PLMN D may send the registration reject to the UE (100) in response to the registration request. The registration reject indicates that the area indicates to the UE (100) that the UE (100) should not attempt on the PLMN or for the MCC corresponding to the PLMN in the provided area. At operation 823, the UE (100) may now try on other available PLMN(s) as per UE's physical location—PLMN A. At operation 824, the UE (100) may send the registration request to the PLMN A. At operation 825, the PLMN A may send the registration accept to the UE (100) in response to the registration request.

In another embodiment, referring to FIG. 8C, the serving network may indicate the UE (100) about a restricted location or a restricted area (for example: cell, TAI geographical co-ordinates, or the like) for the serving PLMN along with the reject cause, while rejecting the UE's registration request (through any NAS of AS signaling) and when the reject is due to the UE (100) trying to register on the PLMN outside the MCC of the UE's physical location. In such a scenario, the UE (100) may not attempt to perform the registration or NAS procedure in the restricted area (i.e., the forbidden area) indicated by network for the PLMN. Alternatively, the UE may not attempt to perform the registration or NAS procedure in the restricted area (i.e., the forbidden area) indicated by network for the MCC of the PLMN.

When the UE (100) determines that its physical location lies within the restricted location or the restricted area indicated by the network, the UE (100) may not attempt to perform the registration on the PLMN on which the UE (100) may be allowed to attempt the registration if the UE (100) determines that its physical location does not lie within the restricted location/area given by the network or when the network does not give any restricted location/area for the corresponding PLMN.

In another embodiment, once the UE (100) receives the reject for the registration request (or through any NAS or AS signaling message) from network and reject is due to the UE (100) trying to register on the PLMN outside the UE's physical location related to the MCC, the UE may create a new PLMN list namely a "Forbidden PLMN list per location" (if does not exist). The UE then may add the corresponding PLMN to "Forbidden PLMN list per location". The UE (100) may not attempt to perform the registration on any of the PLMN(s) list in the "Forbidden PLMN list per location". The UE (100) tries to register (through any NAS or AS signaling) on the one or more other available and allowable PLMN(s) corresponding to the MCC identified by the UE's physical location as determined by UE and not listed in "Forbidden PLMN List per location". The UE (100) deletes all the PLMN(s) listed in the "Forbidden PLMN List per location" and deletes the "Forbidden PLMN List per location" list when the UE successfully registers on any of the PLMNs for normal service or when the UE is switched off and switched on again.

Figure 9:
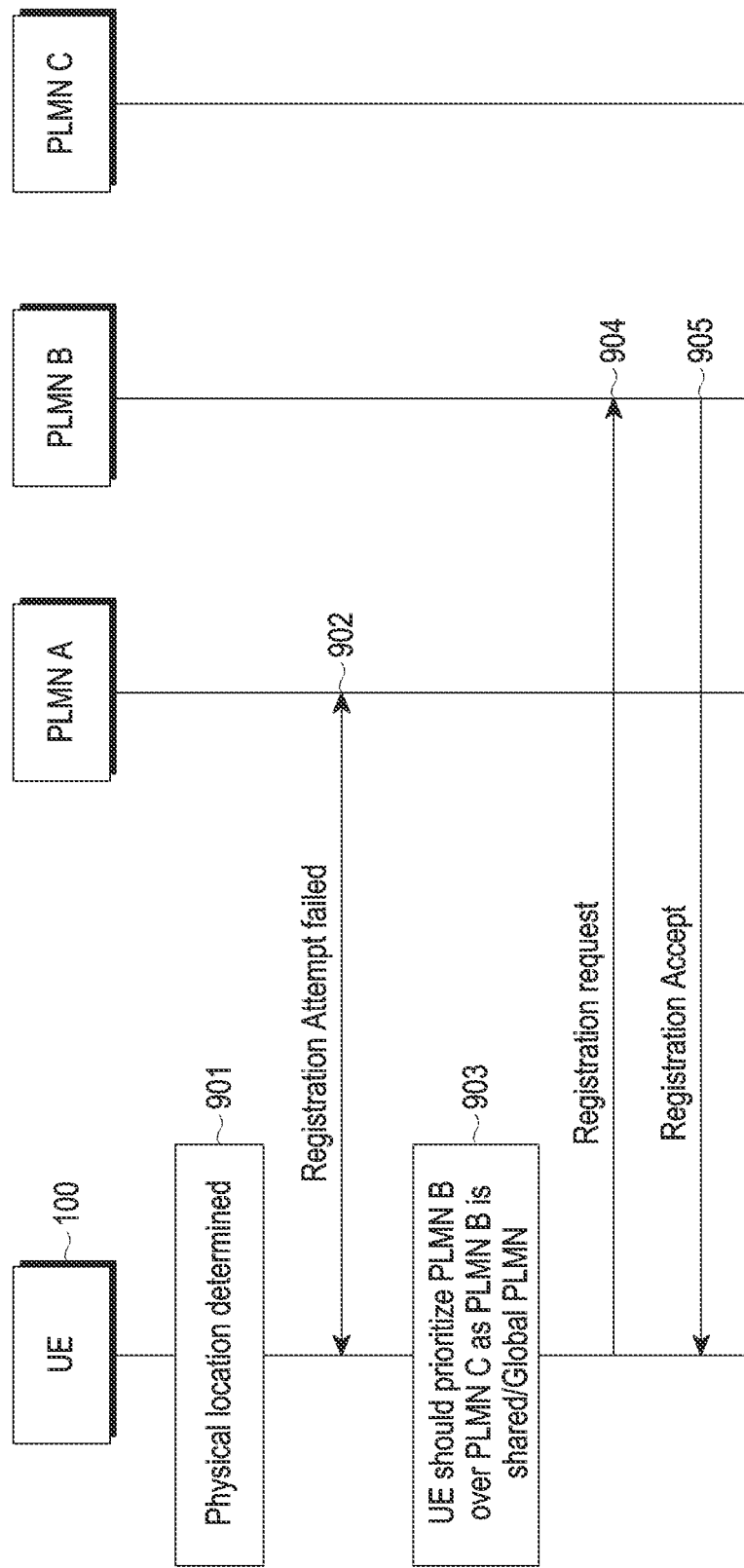
FIG. 9 is an example sequence diagram depicting usage of shared/global PLMN ids by the UE over the PLMN ids having MCC's belonging to other countries, when the UE is not in an international area and not able to find any MCC corresponding to the location the UE determines, according to an embodiment of the disclosure.

FIG. 9 is a sequence diagram depicting usage of shared/global PLMN ids by the UE (100) over the PLMN ids having MCC's belonging to other countries, when the UE (100) is not in an international area and not able to find any MCC corresponding to the location the UE determines, according to an embodiment of the disclosure.

Figure 10:
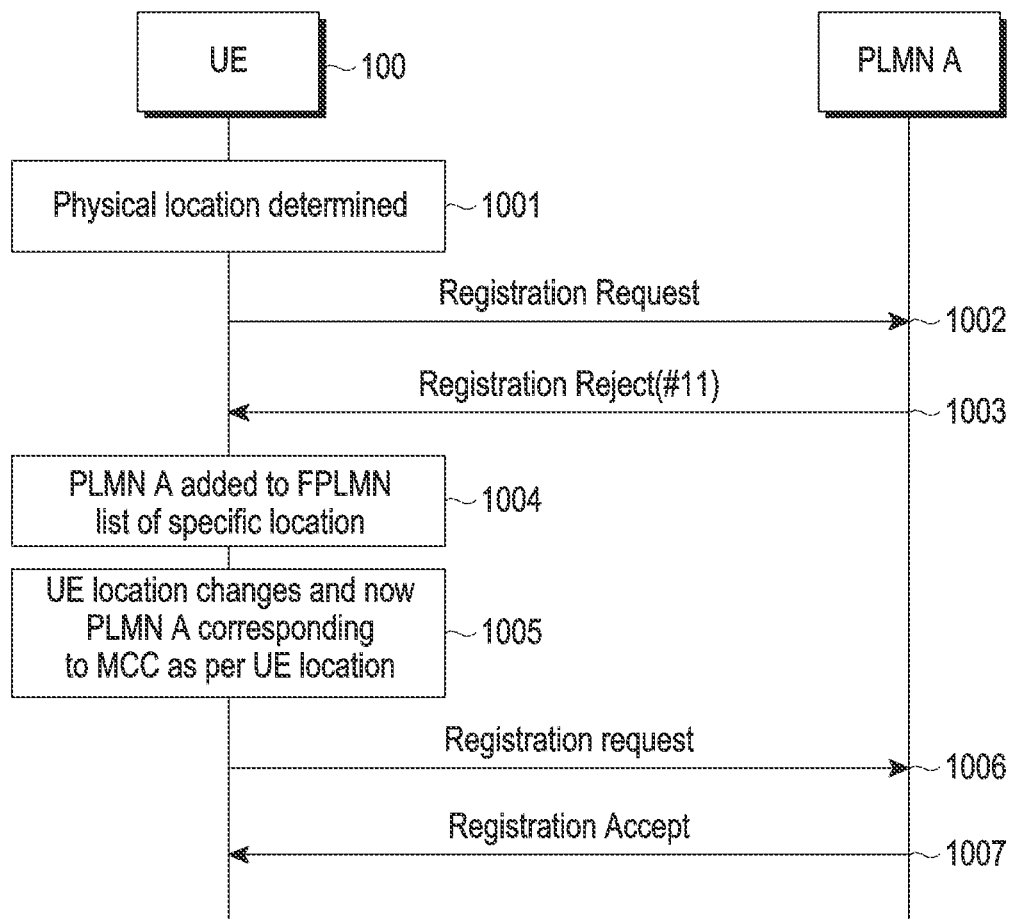
FIG. 10 is an example sequence diagram depicting maintenance of a Forbidden PLMN (FPLMN) list separately by the UE based on the country/location, according to an embodiment of the disclosure.

Embodiments herein enable the UE (100) to try shared/global PLMN ids over the PLMN ids having MCC's belonging to the other countries, when the UE (100) is not in an international area and not able to find any MCC corresponding to the location the UE (100) determines, as depicted in FIG. 10. The UE (100) has to attempt/try the shared/global PLMN ids before trying random PLMNs with other MCCs, since the shared/global PLMN ids have higher probability of providing the communication services in multiple countries.

Referring to FIG. 9, at operation 901, the UE (100) may determine the physical location. At operation 902, the registration attempt failed is between the UE (100) and the PLMN A. At operation 903, the UE (100) may prioritize the PLMN B over the PLMN C as the PLMN B is shared/Global PLMN. At operation 904, the UE (100) may send the registration request to the PLMN B. At operation 905, the PLMN B may send the registration accept to the UE (100) in response to the registration request.

FIG. 10 is a sequence diagram depicting maintenance of a Forbidden PLMN (FPLMN) list separately by the UE (100) based on the country/location, according to an embodiment of the disclosure.

Embodiments herein enable the UE (100) to maintain a FPLMN list separately based on the country/location, referring to FIG. 10. On receiving the reject with an example cause #11 from the PLMN, the UE (100) may add the corresponding PLMN to the respective FPLMN list, which has been determined by the location of the UE (100). If the location of the UE changes, the UE (100) uses the FPLMN list for that specific location instead of having a single FPLMN list for all locations.

Referring to FIG. 10, at operation 1001, the UE (100) may determine the physical location. At operation 1002, the UE (100) may send the registration request to the PLMN A. At operation 1003, the PLMN A may send the registration reject (#11) to the UE (100). At operation 1004, the UE (100) may determine that the PLMN A added to the FPLMN list of specific location. At operation 1005, the UE (100) may determine that the UE location changes and now the PLMN A corresponding to the MCC as per UE location. Based on the determination, at operation 1006, the UE (100) may send the registration request to the PLMN A. At operation 1007, the PLMN A may send the registration accept to the UE (100) based on the registration request.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for handling communication in a wireless network, the method comprising:
   receiving, by a user equipment (UE), a non-access stratum (NAS) message indicating that the UE is not permitted to access a first public land mobile network (PLMN) over a satellite communication from a network entity, the NAS message including a geographical indication and a timer indication;
   determining, by the UE, a geographical location based on the geographical indication;
   storing, by the UE, the geographical location along with a first PLMN identifier (ID) of the first PLMN;
   starting, by the UE, a timer with a timer value determined based on the timer indication; and
   determining, by the UE, that the UE is not allowed to access the first PLMN via satellite access in a geographical area determined based on the geographical location and a current UE location while the timer is running.

2. The method as claimed in claim 1, wherein the UE receives the NAS message, in response to attempting one of a registration procedure, a service request procedure, or a NAS procedure on the first PLMN, or in a case in which the UE is already in registered state over the satellite communication.

3. The method as claimed in claim 1, wherein the UE determines not to select and perform a registration procedure on the first PLMN over satellite access in a case in which the timer is running.

4. The method as claimed in claim 1, wherein the UE determines the timer value by considering the timer indication as a minimum value of the timer values.

5. The method as claimed in claim 1, wherein the NAS message is one of registration reject message, a registration accept message, a service reject message, or a deregistration request message.

6. The method as claimed in claim 1, wherein the UE deletes the stored geographical location and the stored first PLMN ID in a case in which the UE successfully registers on the first PLMN for a normal service, in a case in which the UE is switched OFF or ON, or in a case in which a Universal Subscriber Identity Module (USIM) associated with the UE is removed.

7. The method as claimed in claim 1, wherein the NAS message comprises a cause value indicating that the first PLMN is not allowed to operate at a present UE location, and a list of one or more forbidden PLMN IDs including a PLMN ID of the first PLMN.

8. The method as claimed in claim 1, further comprising:
determining, by the UE, that the UE is allowed to access the first PLMN via satellite access based on the UE moving outside the geographical area or the timer has expired; and
performing, by the UE, a PLMN selection and registration procedure on a second PLMN.

9. A method for handling communication in a wireless network, the method comprising:
receiving, by a network entity of a first public land mobile network (PLMN), a message related to one of a registration procedure, a service request procedure, or a non-access stratum (NAS) procedure from a user equipment (UE), or detecting that the UE is already in a registered state over a satellite communication;
detecting, by the network entity, that the first PLMN is not allowed to operate at a present UE location; and
sending, by the network entity, a NAS message to the UE based on detection, wherein the NAS message indicates that the UE is not permitted to access the first PLMN over a satellite communication and includes a geographical indication and a timer indication,
wherein the NAS message causes the UE not to allow to access the first PLMN via satellite access in a geographical area determined based on the geographical indication and a current UE location while a timer determined based on the timer indication is running.

10. The method as claimed in claim 9, wherein the NAS message is one of registration reject message, a registration accept message, a service reject message, or a deregistration request message.

11. The method as claimed in claim 9, wherein the NAS message causes the UE to determine a geographical location based on the geographical indication, store the geographical location along with a first PLMN ID of the first PLMN, start the timer based on the timer indication, and determine that the UE is not allowed to access the first PLMN via satellite access in the geographical area while the timer is running.

12. A user equipment (UE) for handling communication in a wireless network, the UE comprising:
a processor;
a memory; and
a satellite communication handling controller, coupled with the processor and the memory, configured to:
receive a non-access stratum (NAS) message indicating that the UE is not permitted to access a first public land mobile network (PLMN) over a satellite communication from a network entity, the NAS message including a geographical indication and a timer indication,
determine a geographical location based on the geographical indication,
store the geographical location along with a first PLMN identifier (ID) of the first PLMN,
start a timer with a timer value determined based on the timer indication, and
determine that the UE is not allowed to access the first PLMN via satellite access in a geographical area determined based on the geographical location and a current UE location while the timer is running.

13. The UE as claimed in claim 12, wherein the UE receives the NAS message, in response to attempting one of a registration procedure, a service request procedure, or a NAS procedure on the first PLMN, or in a case in which the UE is already in a registered state over the satellite communication.

14. The UE as claimed in claim 12, wherein the UE determines not to select and perform a registration procedure on the first PLMN over satellite access in a case in which the timer is running.

15. The UE as darned in claim 12, wherein the NAS message is one of a registration reject message, a registration accept message, a service reject message, or a deregistration request message.

16. The UE as claimed in claim 12, wherein the UE deletes the stored geographical location and the stored first PLMN ID in a case in which the UE successfully registers on the first PLMN for a normal service, in a case in which the UE is switched OFF or ON, or in a case in which a universal subscriber identity module (USIM) associated with the UE is removed.

17. The UE as claimed in claim 12, wherein the NAS message comprises a cause value indicating that the first PLMN is not allowed to operate at a present UE location, and a list of one or more forbidden PLMN IDs including a PLMN ID of the first PLMN.

18. A network entity of first public land mobile network (PLMN) for handling communication in a wireless network, the network entity comprising:
a processor;
a memory; and
a satellite communication handling controller, coupled with the processor and the memory, configured to:
receive a message related to one of a registration procedure, a service request procedure, or a non-access stratum (NAS) procedure from a user equipment (UE), or detect that the UE is already in a registered state over a satellite communication,
detect that the first PLMN is not allowed to operate at a present UE location, and
send a NAS message to the UE based on the detection, wherein the NAS message indicates that the UE is not permitted to access the first PLMN over a satellite communication and includes a geographical indication and a timer indication,
wherein the NAS message causes the UE not to allow to access the first PLMN via satellite access in a geographical area determined based on the geographical indication and a current UE location while a timer determined based on the timer indication is running.

19. The network entity as claimed in claim 18, wherein the NAS message is one of registration reject message, a registration accept message, a service reject message, or a deregistration request message.

20. The network entity as claimed in claim 18, wherein the NAS message causes the UE to determine a geographical location based on the geographical indication, store the geographical location along with a first PLMN ID of the first PLMN, start the timer based on the timer indication, and determine that the UE is not allowed to access the first PLMN via satellite access in the geographical area while the timer is running.

\* \* \* \* \*